(12) United States Patent
Mandal et al.

(10) Patent No.: US 11,899,553 B2
(45) Date of Patent: Feb. 13, 2024

(54) RELEVANCE RANKING SYSTEM FOR EVENTS IDENTIFIED BY PERFORMANCE MANAGEMENT SYSTEMS

(71) Applicant: Healtech Software India Pvt. Ltd., Bangalore (IN)

(72) Inventors: Atri Mandal, Bangalore (IN); Sudhir Shetty, Bangalore (IN); Jaisri S, Bangalore (IN); Palavali Shravan Kumar Reddy, Bangalore (IN)

(73) Assignee: Healtech Software India Pvt. Ltd., Karnataka (IN)

( * ) Notice: Subject to any disclaimer, the term of this patent is extended or adjusted under 35 U.S.C. 154(b) by 28 days.

(21) Appl. No.: 17/645,754

(22) Filed: Dec. 23, 2021

(65) Prior Publication Data
US 2023/0104983 A1   Apr. 6, 2023

(51) Int. Cl.
  *G06F 11/34*  (2006.01)
  *G06N 20/00*  (2019.01)
  *G06F 11/30*  (2006.01)

(52) U.S. Cl.
  CPC ...... *G06F 11/3419* (2013.01); *G06F 11/3072* (2013.01); *G06F 11/3452* (2013.01); *G06F 11/3466* (2013.01); *G06N 20/00* (2019.01)

(58) Field of Classification Search
  CPC . G06N 20/00; G06F 11/3072; G06F 11/3419; G06F 11/3452; G06F 11/3466
  USPC .......................................................... 702/186
  See application file for complete search history.

(56) References Cited

U.S. PATENT DOCUMENTS

| | | | |
|---|---|---|---|
| 11,138,088 B2 * | 10/2021 | George | ............... G06F 11/3452 |
| 2020/0089761 A1 * | 3/2020 | Guerra | ................... G06F 40/30 |
| 2020/0250063 A1 * | 8/2020 | George | ............... G06F 11/3419 |

* cited by examiner

*Primary Examiner* — John H Le
(74) *Attorney, Agent, or Firm* — IPHORIZONS PLLC; Narendra Reddy Thappeta

(57) ABSTRACT

An aspect of the present disclosure provides a relevance ranking system for events identified by performance management systems. In one embodiment, a system receives, from one or more performance management systems, events associated with performance metrics and determines, based on the received events, a corresponding relevance score for each performance metric. The system generates a ranking list of the received events based on the corresponding relevance scores (determined for the performance metrics). The system then provides the ranking list of events to a user (such as an administrator). According to another aspect, the system (noted above) performs the steps of receiving, determining, and generating for each time interval of a set of time intervals.

22 Claims, 15 Drawing Sheets

| | Application | Service/component | instance_id | kpi_id | kpi_name | actual_value | upper_threshold | lower_threshold |
|---|---|---|---|---|---|---|---|---|
| 811 → | TelecomApp | Frontend | podxxf01 | 837 | Calls per Minute | 151 | 120 | 50 |
| 812 → | TelecomApp | Frontend | podxxf01 | 848 | JVM GC | 1010 | 950 | 800 |
| 813 → | TelecomApp | Frontend | podxxf01 | 839 | Errors per Minute | 5 | 2 | 0 |
| 814 → | TelecomApp | Backend | poayyb01 | 837 | Calls per Minute | 200 | 150 | 100 |
| 815 → | TelecomApp | Backend | poayyb01 | 843 | Number of Very Slow Calls | 10 | 5 | 2 |
| 816 → | TelecomApp | Frontend | podxxf01 | 840 | Stall Count | 7 | 5 | 0 |
| 817 → | TelecomApp | Backend | poaxxb01 | 841 | Average Response Time | 270 | 25 | 0 |

*FIG. 8A*

```
APP tSA_2_20210901_02-04-54 established Wed Sep 01 02:04:54 CEST 2021
<appname>
<agent>2</agent>
<service name = service_name1>
<process name = process_name1>
<job name = job_name1>
process_name1_job_name1__2_01 SEP 2021_02:06:11:698_Timed out waiting for lock FITL.SECURITY.POSITION
1434465053-1.116164-305.1431000000.....
```

820 (arrow to block above)

825 — "Timed out waiting for lock FITL.SECURITY.POSITION"

*FIG. 8B*

| Application | Service_id | instance_id | kpi_id | kpi_name | anomaly_score | Relevance_score | ranking_order |
|---|---|---|---|---|---|---|---|
| TelecomApp | Frontend | podxxf01 | 837 | Calls per Minute | 0.42 | 0.32 | 7 |
| TelecomApp | Frontend | podxxf01 | 848 | JVM GC | 0.38 | 0.58 | 4 |
| TelecomApp | Frontend | podxxf01 | 839 | Errors per Minute | 0.91 | 0.46 | 6 |
| TelecomApp | Backend | poayyb01 | 837 | Calls per Minute | 0.76 | 0.51 | 5 |
| TelecomApp | Backend | poayyb01 | 843 | Number of Very Slow Calls | 0.93 | 0.97 | 1 |
| TelecomApp | Frontend | podxxf01 | 840 | Stall Count | 0.66 | 0.71 | 3 |
| TelecomApp | Backend | poayyb01 | 841 | Average Response Time | 1 | 0.89 | 2 |

871: # Reservation slot = Minimum
872: [Components]
873: Frontend = 2
874: Backend = 2

| Application | Service_id | instance_id | kpi_id | kpi_name | ranking_order | Final_ranking |
|---|---|---|---|---|---|---|
| TelecomApp | Frontend | podxxf01 | 848 | JVM GC | 4 | 4 |
| TelecomApp | Backend | poayyb01 | 837 | Calls per Minute | 5 | 5 |
| TelecomApp | Backend | poayyb01 | 843 | Number of Very Slow Calls | 1 | 1 |
| TelecomApp | Frontend | podxxf01 | 840 | Stall Count | 3 | 3 |
| TelecomApp | Backend | poayyb01 | 841 | Average Response Time | 2 | 2 |

884 — ranking_order  
885 — Final_ranking

FIG. 8F

RELEVANCE RANKING SYSTEM FOR EVENTS IDENTIFIED BY PERFORMANCE MANAGEMENT SYSTEMS

PRIORITY CLAIM

The instant patent application is related to and claims priority from the co-pending India provisional patent application entitled, "RELEVANCE RANKING SYSTEM FOR INCIDENTS IDENTIFIED BY PERFORMANCE MANAGEMENT SYSTEMS", Serial No.: 202141041383, Filed: 14 Sep. 2021, which is incorporated in its entirety herewith.

BACKGROUND OF THE DISCLOSURE

Technical Field

The present disclosure relates to computing infrastructures and more specifically to a relevance ranking system for events identified by performance management systems.

Related Art

Performance management (PM) Systems are often deployed to aid in the management of the performance of computing environments. Performance management entails examination of inputs (user requests), outputs (responses to user requests) and resource usage while generating the outputs from the inputs. The resources can be infrastructure resources such as compute/CPU, memory/RAM, disk/file storage, etc., or application resources such as database connections, application threads, etc. In contexts when PM Systems employ Artificial Intelligence, they are also referred to as AIOps (AI for IT operations) systems The output of PM systems often identifies events that are of potential interest to the administrators of the computing environments. Events indicate performance situations where resources are under or over-allocated, or faults such as freezing or reboot of systems, etc. The identified events can be those that actually occurred in the computing environment or those predicted to occur.

Aspects of the present disclosure are directed to provide a relevance ranking system for events identified by a PM system, which is of particular importance when a large number of events are identified.

BRIEF DESCRIPTION OF THE DRAWINGS

Example embodiments of the present disclosure will be described with reference to the accompanying drawings briefly described below.

FIGS. 8A and 8B illustrates the manner in which information on events is maintained in one embodiment.

FIG. 8D illustrates the manner in events received from performance management systems are processed in one embodiment.

FIG. 8E depicts portions of configuration data in one embodiment.

FIG. 8F illustrates the manner in which a ranking list (final result) is generated in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
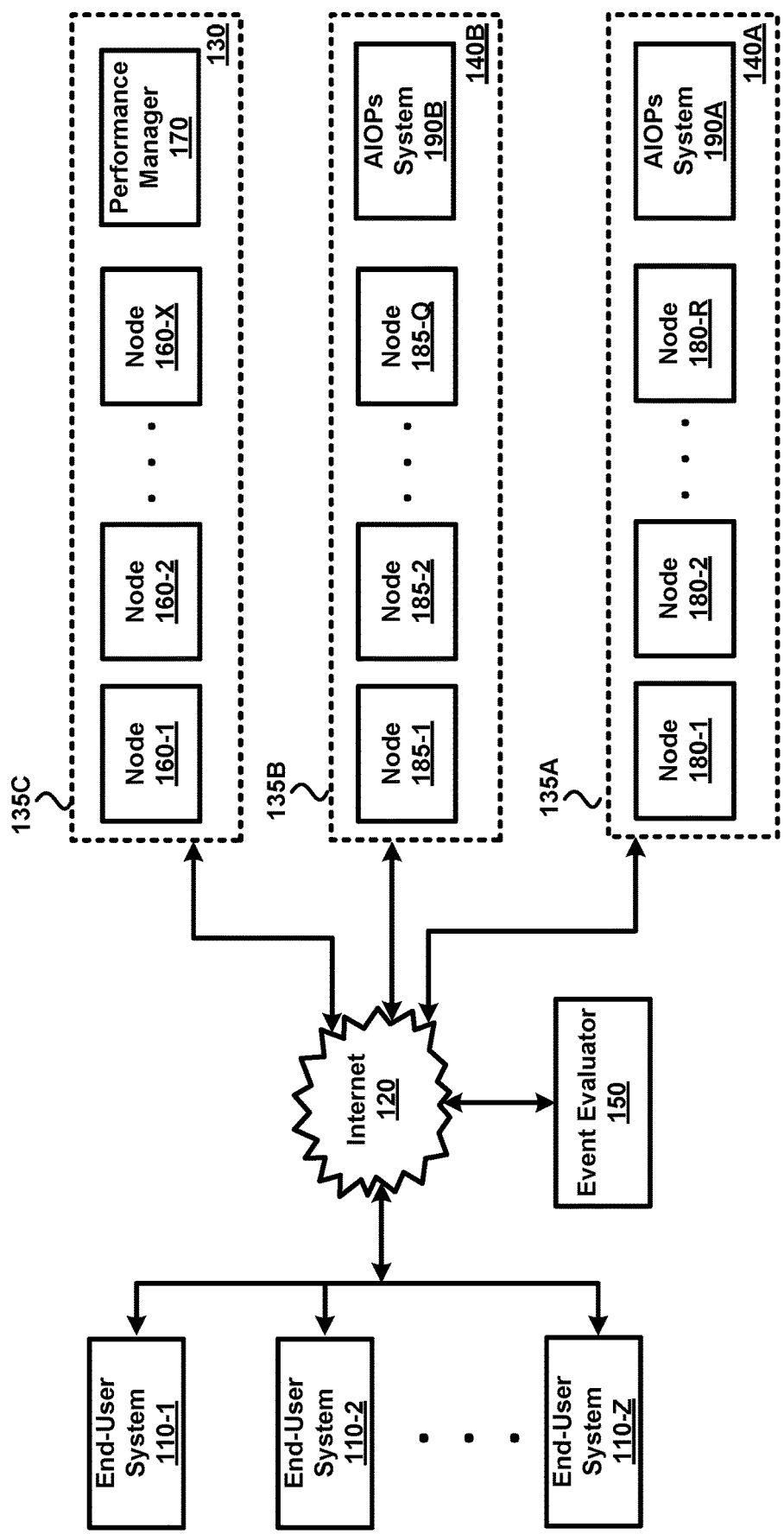
FIG. 1 is a block diagram illustrating an example environment (computing system) in which several aspects of the present disclosure can be implemented.

An aspect of the present disclosure provides a relevance ranking system for events identified by performance management systems. In one embodiment, a system receives, from one or more performance management systems, events associated with performance metrics and determines, based on the received events, a corresponding relevance score for each performance metric. The system generates a ranking list of the received events based on the corresponding relevance scores (determined for the performance metrics). The system then provides the ranking list of events to a user (such as an administrator).

By relying on relevance scores of performance metrics, the system (noted above) is facilitated to provide a relevancy ranking list even when there is incomplete topology information regarding the components of software applications deployed in a computing environment and when the monitoring information is coming from one or more third party monitoring tools (performance management systems).

According to another aspect of the present disclosure, the system (noted above) performs the steps of receiving, determining, and generating for each time interval of a set of time intervals.

According to one more aspect of the present disclosure, the relevance score for a specific performance metric in a specific time interval is determined based on: (A) an importance factor indicating the importance of the specific performance metric compared to other performance metric in the specific time interval, (B) an impact factor indicating the likelihood that the specific performance metric will cause a problem, and (C) an interestingness factor characterizing the rarity of occurrence of the specific performance metric in the specific time interval.

According to yet another aspect of the present disclosure, the system (noted above) determines the relevance scores by first generating machine learning (ML) models corresponding to the performance metrics, each ML model correlating the combinations of importance score, impact score and interestingness factor with corresponding relevance scores for a respective performance metric. The system then predicts the corresponding relevance scores for the performance metrics in the specific time interval based on the ML models.

In other words, the system (noted above) learns a relevance function, based on the features extracted (importance, impact factor, interestingness factor) from the received events, using a supervised machine learning algorithm.

According to an aspect of the present disclosure, the system (noted above) calculates for each received event, an anomaly score indicating a degree of anomaly of the associated performance metric. As such, the importance factor is computed as a sum of anomaly scores of a subset of events associated with the specific performance metric.

According to another aspect of the present disclosure, the impact factor is computed as a conditional probability of a problem occurring due to events associated with the specific performance metric.

According to one more aspect of the present disclosure, the interestingness factor is computed as an IDF (Inverse Document Frequency) weight used in BoW (Bag-of-Words) model in natural language processing. The IDF score indicates how likely it is to see an event in a specified time interval as opposed to the universal set of all events, as is well known.

According to yet another aspect of the present disclosure, the system (noted above) also determines an abnormality score and a problem class for each time interval based on the relevancy scores of the performance metrics/events observed in that time interval.

According to an aspect of the present disclosure, the abnormality score is determined by first training a machine learning (ML) classifier based on relevance score vectors, each relevance score vector representing the relevance scores of the performance metrics in a corresponding time interval. The system then predicts the abnormality score for a specific time interval using the ML classifier.

According to another aspect of the present disclosure, the ML classifier groups the relevance score vectors into clusters, each cluster representing a corresponding problem class. The system (noted above) then determines the problem class for a specific time interval by identifying that a specific relevance score vector for the specific time interval is similar to a first cluster, and then determining a first problem class represented by the first cluster as the problem class for the specific time interval.

According to one more aspect of the present disclosure, the system (noted above) generates the ranking list of the received events (associated with corresponding categories) by first assigning a ranking value to each event based on the relevance score of the associated performance metric. The system then inspects a configuration data to determine that a first category and a second category are to respectively have a first number of events and a second number of events in the ranking list. Accordingly, the system includes in the ranking list, the first number of events associated with the first category having the highest ranking values and the second number of events associated with the second category having the highest ranking values. As such, a user is enabled to view the events related to both the first category and the second category together.

According to yet another aspect of the present disclosure, the first category and the second category relate to one of components of a software application, sub-components of the components of the software application, cloud infrastructures in which the software application is deployed, and performance management systems of the cloud infrastructures.

Thus, the system (noted above) generates the final result (ranking list) using a reservation-based algorithm which takes into account relevance scores computed and comprehensiveness as suggested by component and sub-component information (or similar information) in the configuration data.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing end-user systems 110-1 through 110-Z (Z representing any natural number), Internet 120, computing infrastructures 130, 140A and 140B and event evaluator 150. Computing infrastructure 130 in turn is shown containing nodes 160-1 through 160-X (X representing any natural number) and performance manager 170. Similarly, computing infrastructures 140A and 140B are respectively shown containing nodes 180-1 through 180-P (P representing any natural number) and AIOps system 190A; and nodes 185-1 through 185-Q (Q representing any natural number) and AIOps system 190B. In addition, the block diagram is shown containing computing environments 135A-135C. The end-user systems and nodes are collectively referred to by 110, 160, 180 and 185 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

All the nodes (160) of computing infrastructure 130 are assumed to be connected via an intranet (not shown). Internet 120 extends the connectivity of these (and other systems of the computing infrastructure) with external systems such as end-user systems 110. Each of intranet and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in computing infrastructure 130. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Some of nodes 160 (and also 180 and 185) may be implemented as corresponding data stores. Each data store represents a non-volatile (persistent) storage facilitating storage and retrieval of enterprise by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 (and also 180 and 185) may be implemented as corresponding server systems. Each server system represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

In one embodiment, software applications containing one or more components are deployed in nodes 160 of computing infrastructure 130. Examples of such software include, but are not limited to, data processing (e.g., batch processing, stream processing, extract-transform-load (ETL)) applications, Internet of things (IoT) services, mobile applications, and web applications. Computing infrastructure 130 along with the software applications deployed there is viewed as a computing environment (135C).

It should be noted that in the disclosure herein, computing environment 135C includes computing infrastructure 130 and the software applications deployed thereon. Computing environments 135A and 135B are environments containing corresponding computing infrastructures (140A and 140B) and software applications deployed thereon similar to computing environment 135A, and accordingly their description is not included here for conciseness.

It may be appreciated that each of nodes 160 has a fixed number of resources such as memory (RAM), CPU (central processing unit) cycles, persistent storage, etc. that can be allocated to (and accordingly used by) software applications (or components thereof) executing in the node. Other resources that may also be provided associated with the computing infrastructure (but not specific to a node) include public IP (Internet Protocol) addresses, etc. In addition to such infrastructure resources, application resources such as database connections, application threads, etc. may also be allocated to (and accordingly used by) the software applications (or components thereof). Accordingly, it may be desirable to monitor and manage the resources consumed by computing environment 135C.

Performance manager 170 is a performance management/AIOps system that aids in the management of the performance of computing environment 135C, in terms of managing the various resources noted above. Performance managers 170 collects and/or generates performance metrics (such as CPU utilization, memory used, storage used, etc.) as a time-based sequence of values and predicts/identifies issues/violations based on such performance metrics. Performance manager may use ML (machine learning) based or DL (deep learning) based approaches for co-relating the performance metrics (with time instances or user requests received from end user system 110) and predicting the issues/violations for the performance metrics.

In addition, performance manger 170 may receive (from nodes 160) notifications of actual issues and/or violations that have occurred in nodes 160 with respect to one or more performance metrics. Such issues/violations may be received in the form of log data generated at nodes 160. In the following disclosure, the term "events" refer to the issues/violation predicted by performance manager 170 as well as issues/violations that actually occurred at nodes 160.

AIOps systems 190A and 190B are systems similar to performance manger 170 that aid in the management of the performance of computing environments 135A and 135B respectively. It may be appreciated that each of AIOps systems 190A and 190B also predicts violations/issues for the corresponding computing environments, in addition to receiving notifications of actual violations/issues that have occurred at nodes 180 and 185 respectively.

As noted in the Background section, there may be situations where a large number of events (typically, a few thousands) are identified by performance manager 170. It may be accordingly be desirable that a user such as an administrator of computing environment 135C be made aware of specific events (from the large number) of particular importance, thereby enabling the user/administrator to take appropriate corrective actions at the earliest.

Event evaluator 150, provided according to several aspects of the present disclosure, provides a relevance ranking system for events identified by performance management systems (such as performance manager 170). Though shown external to computing infrastructure 130, in alternative embodiments, event evaluator 150 may be implemented internal to computing infrastructure 130, for example, on one of nodes 160 or as a system connected to the intranet in computing infrastructure 130. The manner in which events evaluator 150 provides a relevancy ranking system is described below with examples.

3. Relevancy Ranking System for Events

Figure 2:
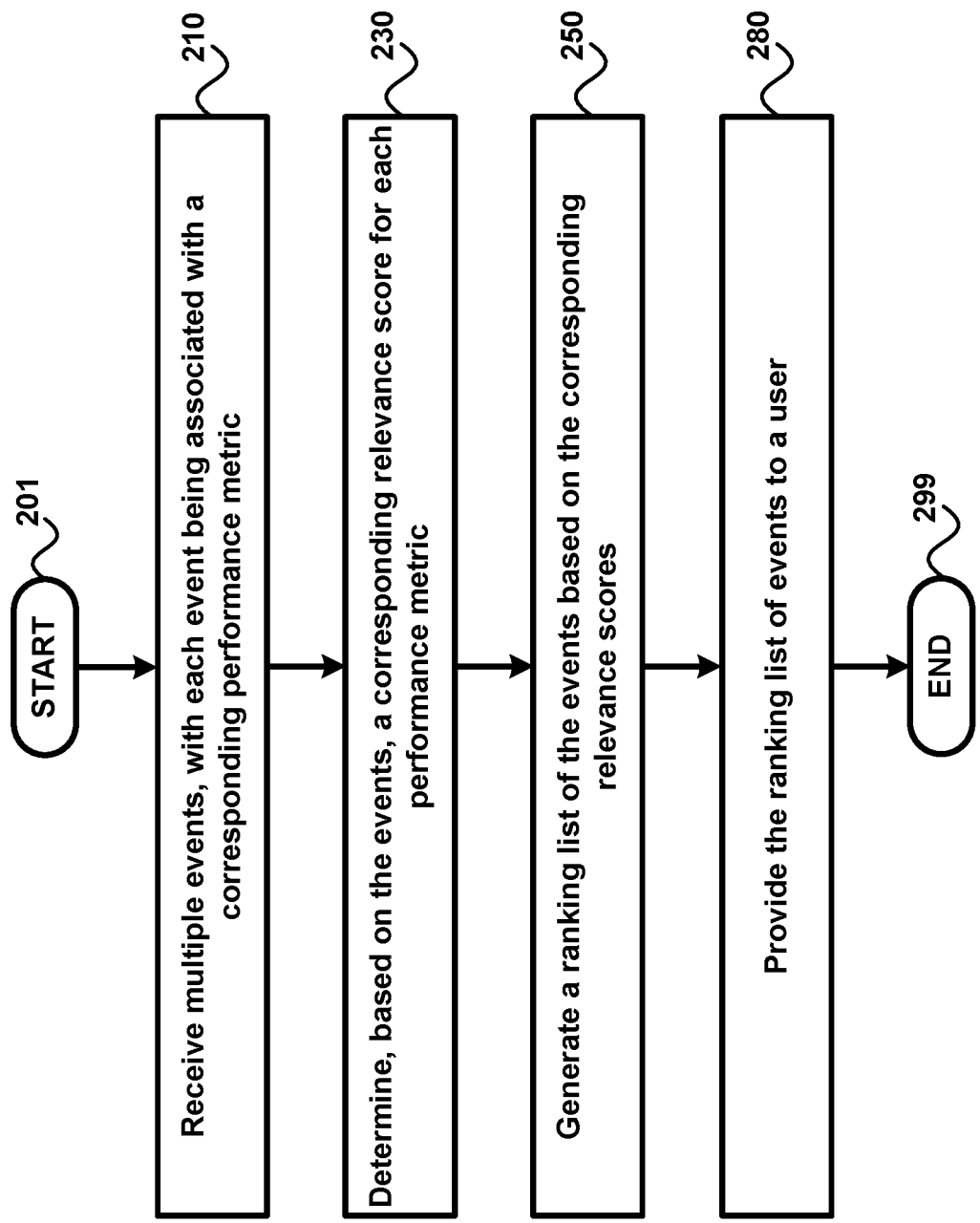
FIG. 2 is a flow chart illustrating the manner in which a relevance ranking system for events identified by performance management systems is provided according to several aspects of the present disclosure.

FIG. 2 is a flow chart illustrating the manner in which a relevance ranking system for events identified by performance management systems (e.g., performance manager 170) is provided according to several aspects of the present disclosure. The flowchart is described with respect to the systems of FIG. 1, in particular event evaluator 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, event evaluator 150 receive multiple events, with each event being associated with a corresponding performance metric. As noted above, an event represents any issue/violation that actually occurred or is predicted by a performance management system. The events may be received from the performance management systems such as performance manager 170 and/or AIOps systems 190A-190B. Each event specifies the details of the corresponding performance metric for which the issue/violation was identified.

In step 230, event evaluator 150 determines, based on the events, a corresponding relevance score for each performance metric. The relevance score for a performance metric represents a measure (e.g., a value between 1 and 100) of the importance of the performance metric determined based on events. For example, when a large number of events are associated with a performance metric, the relevance score is typically high, while when a smaller number of events is associated with a performance metric, the relevance score is low.

In step 250, event evaluator 150 generates a ranking list of the events based on the corresponding relevance scores determined for the associated performance metrics. The ranking list indicates a respective ranking value (e.g., a value between 1 to 100) for each event. According to one convention, a higher ranking is represented with a lower numeric value (e.g., 1) indicating that the event is of very high importance and a lower ranking is represented by a higher numeric value (e.g., 20) indicating that the event is of very low importance. Any other suitable conventions may be used (e.g., providing ranking values such as "High", "Medium", "Low", etc.) for representing the ranking as will be apparent to one skilled in the relevant arts.

In step 280, event evaluator 150 provides the ranking list of events to a user, such as an administrator of the computing environment (135). The ranking list may be displayed to the user on one of end-user systems 110 or may be send in the form of a communication (e.g., email, SMS) to the user. Control passes to step 299, where the flowchart ends.

Thus, event evaluator 150 provides a relevance ranking system for events identified by performance management systems (such as performance manager 170). It may be appreciated that the ranking list enables the user/administrator to be made aware of specific events of particular importance, even in situations where a large number of events (typically, a few thousands) are identified by the performance management system. The user/administrator may thereby take appropriate corrective actions for events having higher rank first (e.g., rank values 1, 2, 3, etc.), before taking actions for events having lower rank (e.g., rank values 10, 15, 20, etc.).

According to an aspect, event evaluator 150 performs the steps of FIG. 2 for each time interval of a sequence of time intervals (e.g., every 5 minutes, every 2 hours, every 1 day, etc.). Such performance enables the user/administrator to determine the events of importance in the specific time interval of interest.

According to another aspect, event evaluator 150 also determines an abnormality score and a problem class for each time interval based on the relevancy scores of the performance metrics/events observed in that time interval. The abnormality score represents a measure of the number and severity of issues/violations of the performance metrics that have occurred in the time interval, with a higher value indicating that a larger number and/or more severe issues/violations have occurred and a lower value indicating otherwise. The problem class indicates a previously determined class of problems that may have been tagged/identified by the user/administrator, and may assist the user/administrator to determine and perform the appropriate corrective actions.

The manner in which event evaluator 150 provides several aspects of the present disclosure according to the steps of FIG. 2 is illustrated below with examples.

4. Illustrative Example

FIGS. 3, 4, 5, 6, 7, 8A-8F and 9A-9B illustrate the manner in which a relevance ranking system for events identified by performance management systems (e.g., performance manager 170) is provided in one embodiment. Each of the Figures is described in detail below.

Figure 3:
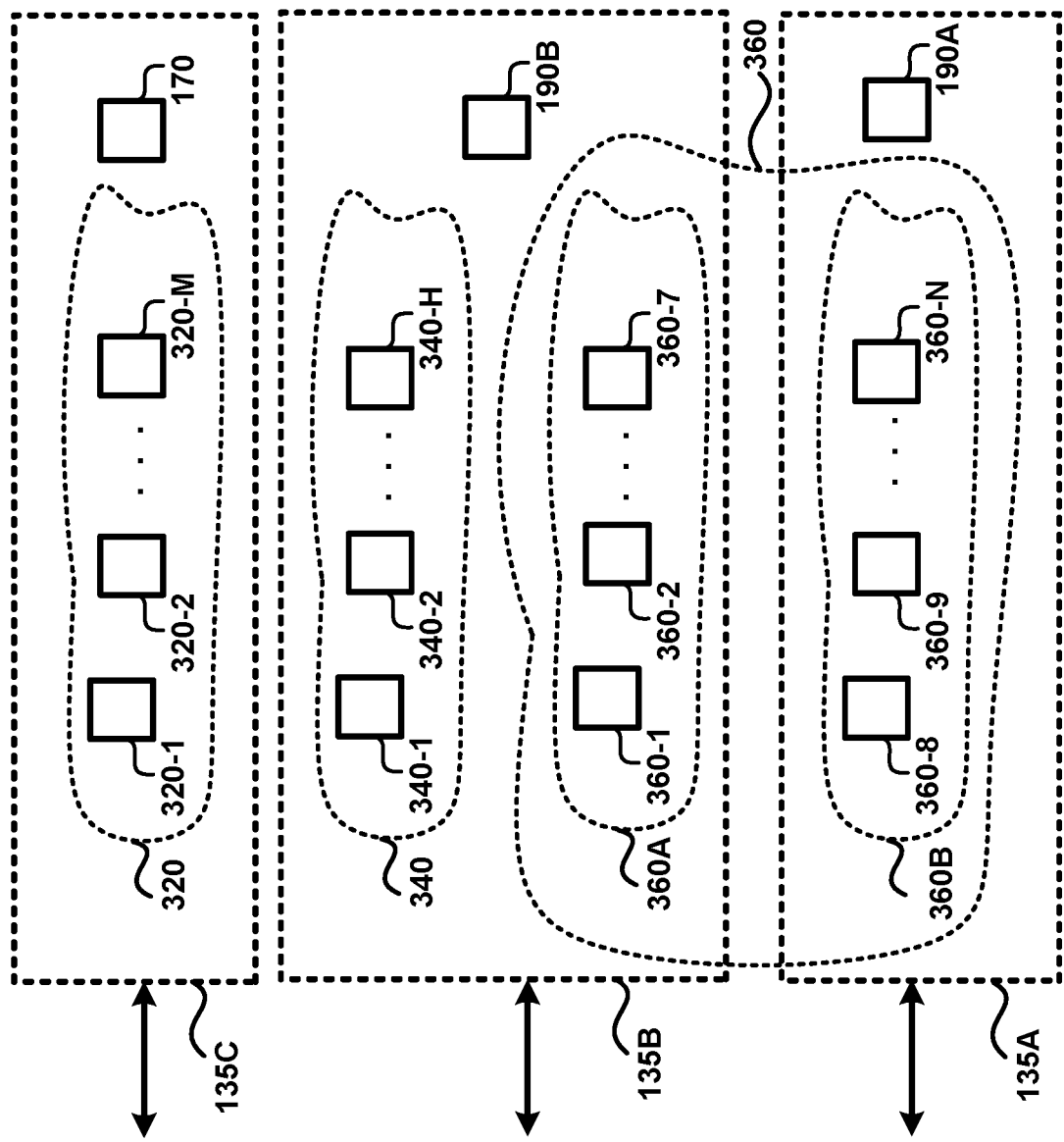
FIG. 3 illustrates the manner in which software applications are hosted in computing infrastructures in one embodiment.

FIG. 3 illustrates the manner in which software applications are hosted in computing infrastructures in one embodiment. In one embodiment, virtual machines (VMs) form the basis for deployment of various software applications in the nodes of computing infrastructures 140A, 140B and 130. As is well known, a virtual machine may be viewed as a container in which other execution entities are executed. A node/server system can typically host multiple virtual machines, and the virtual machines provide a view of a complete machine (computer system) to the user applications executing in the virtual machine.

A cloud for a customer/tenant is provisioned (created) by allocating a desired number of VMs hosted on nodes 180/

185/160 in computing infrastructures 140A, 140B and 130. For illustration, clouds 320, 340 and 360 are shown deployed in the nodes of computing infrastructures 140A, 140B and 130 using VMs. It may be appreciated that many environments often host a large number (100+) of clouds across multiple computing infrastructures.

Cloud 360 is shown containing VMs 360-1 through 360-N (N representing any natural number) that may be provisioned on nodes 180 of computing infrastructure 140A (assumed to be an on-prem system) and nodes 185 of computing infrastructure 140B (assumed to be a cloud infrastructure). Cloud 360 is accordingly a hybrid cloud provisioned across the nodes of multiple computing infrastructures. Specifically, groups 360A and 360B respectively represents the set of VMs provisioned in on-prem system 140A and cloud infrastructure 140B.

It may be appreciated that in cloud 360, events may be generated by both AIOps systems 190A and 190B indicating the issues/violations of performance metrics in the nodes/VMs/components of software applications deployed in their corresponding groups. In such scenarios, it may be extremely hard to get the correct topology (of deployment of components) and also getting the log data, etc. may be difficult. As such, correlated alerts from AIOPs systems 190A/190B may not be possible because of the absence of topology and log data.

However, administrators such as SREs (site reliability engineers) are typically still interested in monitoring what are the most interesting events which happened during the last few time intervals so that they can take corrective/remedial actions if they suspect there is a problem. Event evaluator 150 overcomes the challenges faced in hybrid environments and still highlights the most relevant events. The manner in which event evaluator 150 may be implemented is described below with examples.

5. Event Evaluator

Figure 4:
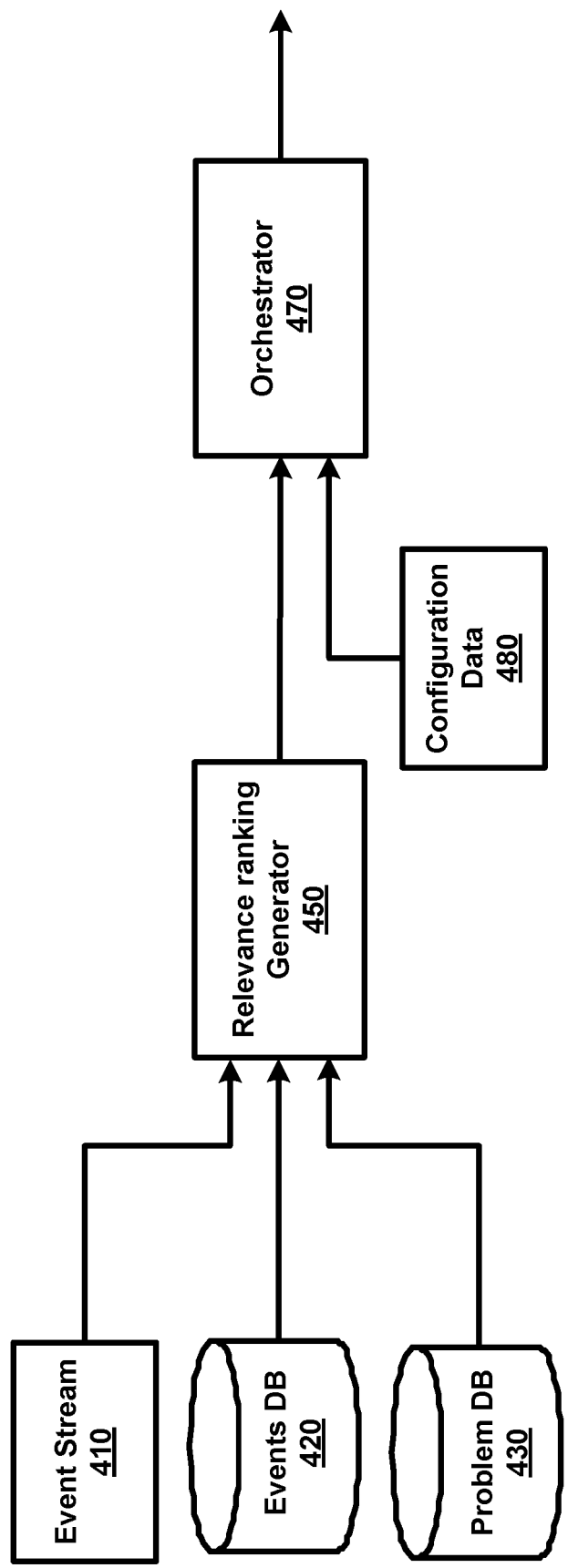
FIG. 4 is a block diagram illustrating an example system architecture of a system providing several aspects of the present disclosure.

FIG. 4 is a block diagram illustrating an example system architecture of a system (event evaluator 150) providing several aspects of the present disclosure. The block diagram is shown containing event stream 410, events database (DB) 420, problem database (DB) 430, relevance ranking generator 450, orchestrator 470 and configuration data 480. Each of the blocks is described in detail below.

Event DB 420 maintains information on the historical events, that is events that have been processed earlier by event evaluator 150. In particular, the information specifies the performance metric, issue/violation of the metric, and the component/sub-component where the violation/issue occurred. Example event information maintained by event evaluator 150 is shown in table 810 of FIG. 8A and data portion 820 of FIG. 8B, described in detail below.

Problem DB 430 maintains information on the historical events associated with a problem. The problem may be determined manually by the administrator based on the specific events and may be stored associated with the corresponding events. Example problem data maintained by event evaluator 150 is shown in table 830 of FIG. 8C described in detail below.

Event stream 410 represents the sequence of events received by event evaluator 150 from one or more performance management systems such as performance manager 170 and AIOps systems 190A/190B. In one embodiment, the events in event stream 410 are received similar to the format shown in table 810 of FIG. 8A—that is each event is associated with a uniquely identified performance metric along with a metric value and threshold values indicating the violation (with values same or different from those shown in columns 806-808).

It should be noted that event evaluator 150 does not assume any specific type of outlier detection mechanism at the performance management systems, and accordingly needs to remove the anomalies which are periodic, or which appear in almost every time interval. These may be caused by various factors e.g., wrong thresholding or the fact that enough training data is not available to identify the periodic anomalies.

Relevancy ranking generator 450 receives the data from event stream 410, event DB 420 and problem DB 430, extracts feature such as importance score, impact factor, interestingness factor and learns a relevance function, based on the extracted features, using a supervised machine learning algorithm, and calculates a relevance score for the received events. Relevance ranking generator 450 then generates a ranking of the events based on the corresponding relevance scores and forwards the rankings to orchestrator 470.

Orchestrator 470 generates a ranking list of events based on the rankings received from relevancy ranking generator 450. It may be appreciated that to display the significant events, orchestrator 470 considers not only the overall ranking but also takes into consideration comprehensiveness. Basically, it may be desirable to include relevant information which may be useful for debugging or triaging. Configuration data 480 specifies the various categories according to which the events are to be grouped. Orchestrator 470 generates the final result (ranking list) using a reservation-based algorithm which takes into account relevance scores computed and comprehensiveness as suggested by category information in configuration data 480.

The manner in which relevancy ranking generator 450 may be implemented is described below with examples.

6. Relevance Ranking Generator

Figure 5:
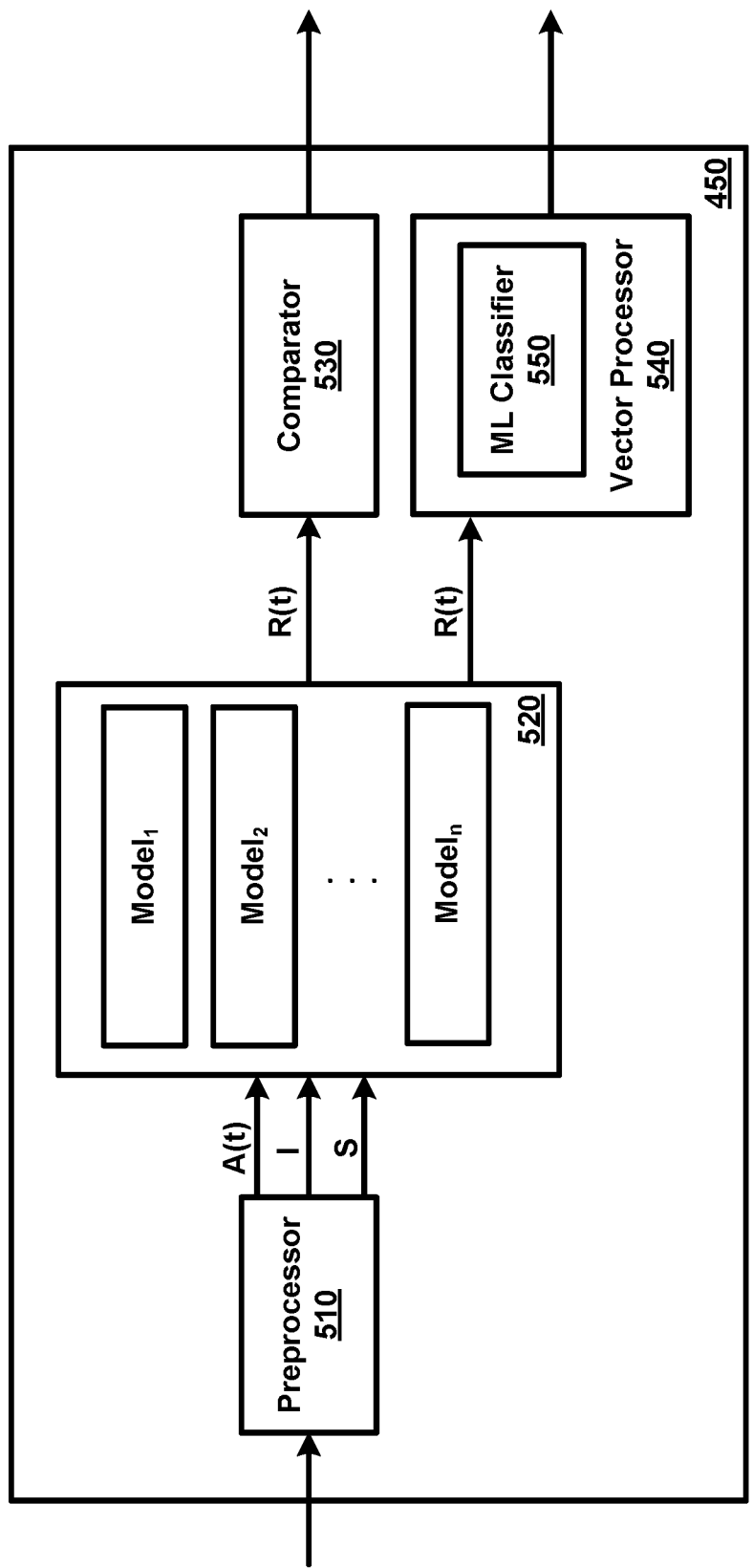
FIG. 5 is a block diagram illustrating the manner in which relevance ranking for events is generated according to several aspects of the present disclosure.

FIG. 5 is a block diagram illustrating the manner in which relevance ranking for events is generated according to several aspects of the present disclosure. The block diagram of relevance ranking generator 450 is shown containing preprocessor 510, models 520 (in turn shown containing Model-1, Model-2 . . . Model-n), comparator 530 and vector processor 540 (in turn shown containing ML (machine learning) classifier 550). Each of the blocks is described in detail below.

Preprocessor 510 receives the events (and corresponding information) from event stream 410 and processes them along with the historical events information maintained in event DB 420 and problem DB 430. Preprocessor 510 first calculates an anomaly score for each of the events received as part of event stream 410. The anomaly score represents the extent of violation (degree of anomaly) in the performance metric and may be computed based on the upper and lower thresholds in a pre-determined way. Example anomaly scores calculated by preprocessor 510 is shown in column 861 of table 850 in FIG. 8D described in detail below.

Preprocessor 510 then extracts the most relevant features to be used to determine the relevance of the performance metric events. In one embodiment, the following features are extracted for every performance metric which has an event in a specific time interval $[t0, \ldots, tn]$, where tn is the time instance is the nth time instance in the time interval:

1. Importance score A(t) which is equal to the sum of the anomaly scores for that performance metric, that is:

$$A(t)=\Sigma \epsilon$$

2. Impact factor (I) which refers to the likelihood that given an event on that performance metric value, the event will eventually turn into a problem. It is calculated as:

$$I=p(P(t)|V(t))$$

where V(t) implies there is a violation in time interval t and P(t) implies that a problem has happened because of a violation in the specific time interval. Note that the problem may have actually happened in a different time interval but the cause of the problem (that is V(t)) happened in that interval. The impact factor I represents a conditional probability of problem occurred given there is a violation of this specific performance metric.

3. Interestingness factor (S) which measures the rarity of occurrence of the specific performance metric in the specific time interval. It may be appreciated that an event will be interesting in the context of a problem if it is a rare event, that is it does not occur usually in all time intervals. This implies that that event has something to do with the problem that may be happening during this specific time interval. In one embodiment, the interestingness factor is defined in accordance with IDF (Inverse Document Frequency) weights used for BoW (Bag-of-Words) model in natural language processing as is well known in the relevant arts:

$$S = \log \frac{N}{1+n}$$

where N=total no. of historical events observed for all performance metrics, n=number of events for the specific metric during the specific time interval.

Preprocessor 510 calculates the above noted three features for each event in the specific time interval and then forwards the calculated values as an input data set to models 520. After computing/extracting the above noted features, relevancy ranking generator 450 generates a relevance score as:

$$R^{(k)}(t)=f_k(A^{(k)}(t),I^{(k)},S^{(k)}) \quad (i)$$

where $f_k$ is the ranking function dependent on the anomaly score, impact factor and the interestingness factor for a specific performance metric (k).

It may be appreciated that the mapping/ranking function $f_k$ may be different for different performance metrics as different performance metrics have different sensitivity to the individual features. In one embodiment, the determination of the raking function is viewed as a binary classification problem which predicts whether an event is relevant/irrelevant based on $A^{(k)}(t)$, $I^{(k)}$ and $S^{(k)}$ scores for the corresponding performance metric. After the model is trained, the weights of the model can be used to predict the relevance score. To determine the mapping function, a family of models is used—one for each performance metric and the weights of the function are learnt using historical values of the performance metric at different historic time intervals.

Models 520 represents a family of various machine learning (ML) or deep learning (DL) based models (Model-1, Model-2, etc.) that corelates the received input data set with corresponding relevance scores for different performance metrics. The models may be generated using any machine learning approaches such as KNN (K Nearest Neighbor), Decision Tree, etc. or deep learning approaches such as Multilayer Perceptron (MLP), Convolutional Neural Networks (CNN), Long short-term memory networks (LSTM) etc. Various other machine/deep learning approaches can be employed, as will be apparent to skilled practitioners, by reading the disclosure provided herein. In an embodiment, supervised machine/deep learning approaches are used. In one embodiment, logistic regression (LR) a supervised learning classification algorithm is used to predict the relevance scores.

The input data set is fed into each of the models (Model-1, Model-2, etc.) based on which performance metric is being currently modelled and the models learn in parallel. In other words, the weights of the models are trained based on the input data set according to the specific ML/DL approach implemented in each model. Each model then generates/predicts values (predicted values) for the relevance score of the corresponding performance metric for future time instances based on the training, as is well known in the relevant arts. Example relevance scores generated by models 520 is shown in column 862 of table 850 in FIG. 8D described in detail below. The predicted values/relevance scores (R(t)) of models 520 are forwarded to comparator 530 and vector processor 540.

Comparator 530 receives the relevance scores and generates a ranking for each event in the specific time interval. Comparator 530 first assigns relevance scores to the events based on the relevance scores determined/predicted for each performance metric. Comparator 530 then generates a ranking based on the assigned relevance scores of the events. If multiple events are associated with the same performance metric and accordingly assigned the same relevance score, the ranking may be determined based on one or more of the individual anomaly scores associated with the events (for example, a higher ranking for higher anomaly score), the specific components/sub-components associated with the events (for example, a higher ranking for backend components), etc. Example rankings generated by comparator 530 is shown in column 863 of table 850 in FIG. 8D described in detail below.

Comparator 530 forwards the generated ranking for all the events in the specific time interval to orchestrator 470 which operates to generate the final result (ranking list) based on the rankings and comprehensiveness of the result. The manner in which orchestrator 470 may generate and provide/display the ranking list is described below with examples.

7. Orchestrator and Sample User Interface

Figure 6:
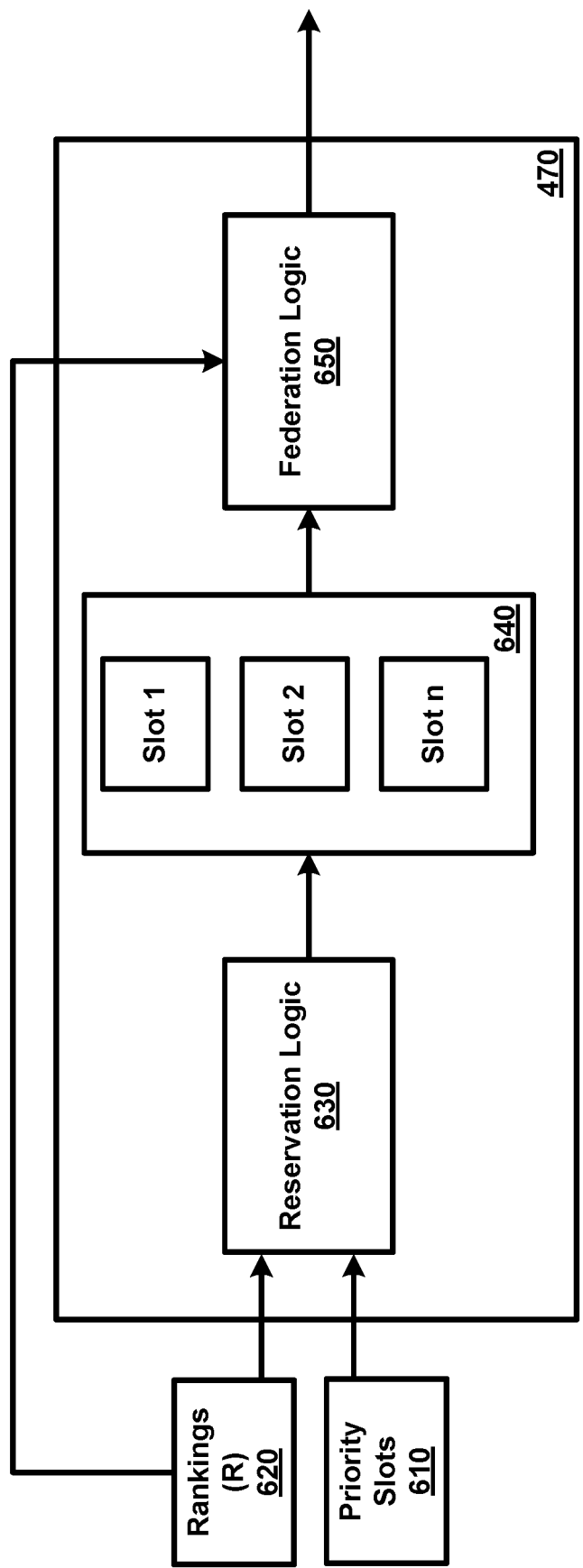
FIG. 6 is a block diagram illustrating the manner in which a ranking list of events is generated according to several aspects of the present disclosure.

FIG. 6 is a block diagram illustrating the manner in which a ranking list of events is generated according to several aspects of the present disclosure. The block diagram of orchestrator 470 is shown containing priority slots 610, rankings (R) 620, reservation logic 630, slots 640 (in turn shown containing Slot 1, Slot 2 . . . Slot m) and federation logic 650. Each of the blocks is described in detail below.

Priority slots 610 refers to reserved slots for each category (such as component/sub-component) based on the information specified in configuration data 480. Broadly, configuration data 480 specifies the number of priority slots for different categories that may relate to one of components of software applications, sub-components of the components of software applications, cloud infrastructures in which the software applications are deployed, and performance management systems deployed in the cloud infrastructures. Example priority slots is shown in data portion 870 of FIG. 8E described in detail below.

Rankings (R) 620 refers to the rankings of the events in the specific time interval received from relevance ranking generator 450 (in particular, comparator 530). Slots 640 represent entries in the ranking list, each slot corresponding to an entry.

Reservation logic 630 first selects/reserves a list of minimum slots (in slots 640) for each category based on priority slots 610 and also based on rankings 620. Reservation logic 630 then tries to fill up the slots from rankings 620 based on the category. Finally, when all the reserved slots are filled, federation logic 650 ranks the remaining events in order of their relevance scores. The results/slots are then sorted in reverse chronological order by federation logic 650 and returned as the final result (ranking list).

Thus, orchestrator 470 operates to include in the ranking list, a first number of events associated with a first category having the highest ranking values and a second number of events associated with a second category having the highest ranking values. As such, a user is enabled to view the events related to both the first category and the second category together. In general, events from as many categories (components) as possible are included in the ranking list so that important information is not omitted. Example ranking list generated by orchestrator 470 is shown in table 880 of FIG. 8F described in detail below.

Thus, orchestrator 470 generates the final result (ranking list) using a reservation-based algorithm which takes into account relevance scores computed and comprehensiveness as suggested by category information in configuration data 480. The final result may be then provided to a user/administrator. In one embodiment, the final result is displayed to the user on a user interface associated with one of end-user systems 110. A sample user interface that may be provided by orchestrator 470 is described in detail below.

Figure 7:
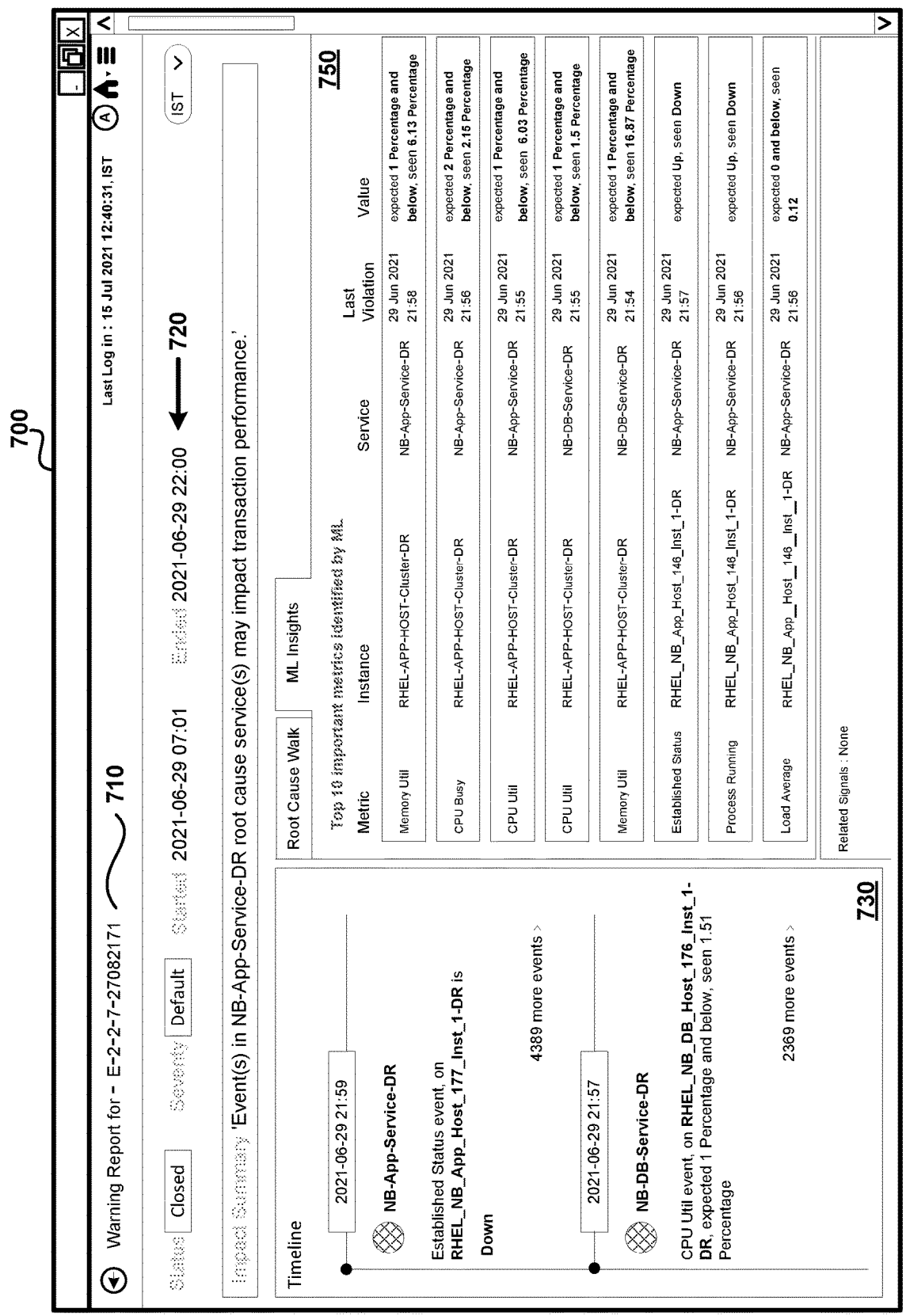
FIG. 7 is a graphical user interface depicting a ranking list of events in a specific time interval in one embodiment.

FIG. 7 is a graphical user interface depicting a ranking list of events in a specific time interval in one embodiment. Display area 700 represents a portion of a user interface displayed on a display unit (not shown) associated with one of end-user systems 110. In one embodiment, display area 700 corresponds to a web page rendered by a browser executing on the end-user system. Web pages are provided by event evaluator 150 (in particular, orchestrator 470) in response to a user/administrator sending appropriate requests (for example, by specifying corresponding URLs in the address bar) using the browser.

Display area 710 indicates the problem class ("E-2-2-7-27082171") determined for the specific time interval. The manner in which the problem class is determined is described in detail in the below sections. Display area 720 indicates the specific time interval (from "2021-06-29 07:01" to "2021-06-29 22:00") for which events have been processed and ranked in the ranking list.

Display area 730 displays a timeline of events as per the ranking list in the reverse chronological order (older events first). The events shown in display area 730 represent the top 2 ranked events in the ranking list. Additionally, display area 750 displays the top 10 performance metrics and corresponding events/violations in the specific time interval.

Thus, event evaluator 150 provides the ranking list (final result) to a user, for example, an administrator of cloud 360. According to an aspect, event evaluator 150 also determines an abnormality score and a problem class for each specific time interval based on the relevancy scores of the performance metrics/events observed in that time interval. The manner in which event evaluator 150 may determine the abnormality score and problem class is described below with examples.

8. Abnormality Score and Problem Class

Referring again to FIG. 5, vector processor 540 determines the overall abnormality score for a given time interval based on the relevance scores of the performance metrics. As noted above, the abnormality score represents a measure of the number and severity of issues/violations of the performance metrics that have occurred in the specific time interval. It may be appreciated that the relevance scores are typically in the form of a variable length vector depending on the number of events in the specific time interval.

Vector processor 540 receives the relevance scores from relevance ranking generator 450 and first converts the variable length vector into a fixed length format. For example, assuming that the relevance scores are as follows: $[r_1, r_2, \ldots r_i, \ldots r_n]$ where $r_i$ is the relevance score of the $i^{th}$ performance metric received from relevance ranking generator 450. It should be noted that relevance ranking generator 450 is the relevance scores for only a few performance metrics (for which there are corresponding events) in a particular time interval. This is converted to a sparse vector by filling up the remaining values (for whom there are no relevance scores) as 0. Thus, if there are n performance metrics under consideration, the vector will always be a n×1 vector of real numbers.

After the fixed length representation is obtained, machine learning (ML) classifier 550 is trained based on historical data. ML classifier 550 predicts if a particular time interval represented by the n×1 vector is anomalous or not (in particular, by predicting the abnormality score for the particular time interval). One possible implementation of ML classifier 494 can be KNN (k nearest neighbors) but other machine learning techniques are equally applicable. The output of ML classifier 550 for a specific time interval may be provided/displayed to a user/administrator.

According to an aspect, vector processor 540 also determines a problem class for each time interval based on the relevancy scores of the performance metrics/events observed in that time interval. As noted above, the problem class indicates a previously determined class of problems that may have been tagged/identified by the user/administrator, and may assist the user/administrator to determine and perform the appropriate corrective actions.

The above noted relevance score vectors are used for problem class determination as well. In one embodiment, a clustering logic is used to find the nearest problem(s) for a particular set of relevance scores. It should be noted that if the problem vectors are clustered, they form separate clusters for different problem types/classes. By finding the closeness of a current vector (representing the relevance scores for a current time interval) to one of those clusters, the problem class can be predicted.

For example, assuming that the following reverse index is created:

$P1 \to [R11, R12, \ldots R1n] \to [R1']$ $P2 \to [R21, R22, \ldots R2n] \to [R2']$ etc.

At runtime, the cosine similarity with R1', R2', etc. is computed and the problem corresponding to the nearest vector represents the problem type/class identified and the confidence score may be equal to the similarity measure.

In other words, if the predicted problem is more similar to any of the problems that have been seen already, then it can be determined as follows:

Predicted Problem = $P$ such that $P$ satisfies:

$$\psi = \underset{i}{\mathrm{argmax}}(sim(R(t), R'_i))$$

where $\psi$=Confidence value, $R(t)$ is the relevance vector of the current interval and $R_i'$ is the average signature corresponding to the $i^{th}$ problem. The function sim(a,b) gives the similarity score between a and b vectors.

After determining the relevance scores and the possible problem class that may be reflected by the relevance scores, the problem class may be provided/displayed to a user/administrator (similar to display area 710 of FIG. 7).

Thus, according to several aspects of the present disclosure, event evaluator 150 ranks metric violations or events within a specific time interval and returns the most significant events using machine learning techniques. Event evaluator 150 employs concepts from text analytics world to compute relevance of events in the AIOps world. Event evaluator 150 provides such ranking even in the absence of complete topology or in the absence of logs and traces. Sample data that may be maintained/generated by event evaluator 150 is described below with examples.

9. Sample Data

Figure 8C:
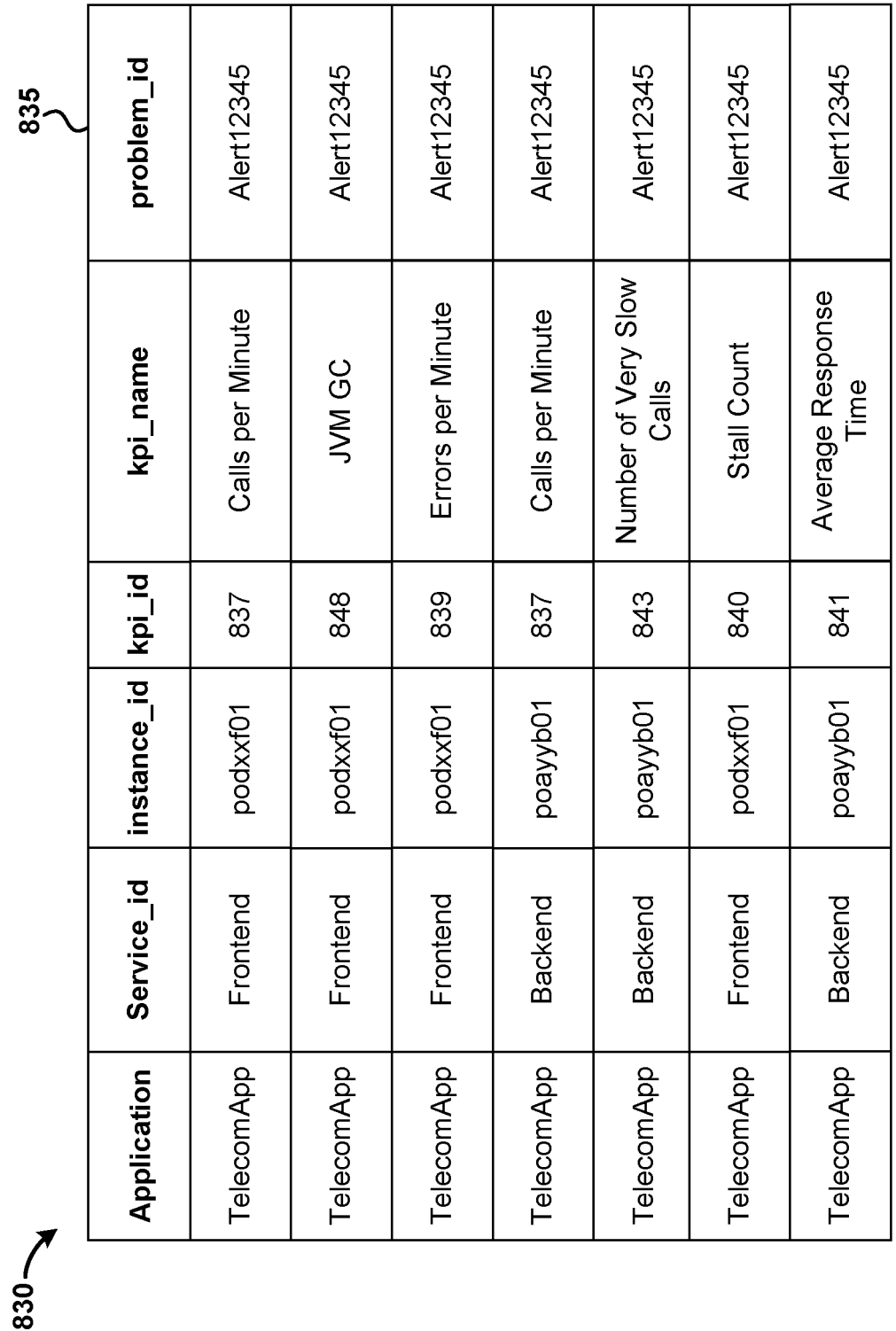
FIG. 8C illustrates the manner in which details of the problems associated with events is maintained in one embodiment.

FIGS. 8A and 8B illustrates the manner in which information on events is maintained in one embodiment. In particular, FIG. 8A depicts sample metric data, while FIG. 8B depicts sample log data. Though shown in the form of tables, the metric data (and the data of FIGS. 8C, 8D and 8F) may be collected/maintained according to other data formats (such as extensible markup language (XML), etc.) and/or using other data structures (such as lists, trees, etc.), as will be apparent to one skilled in the relevant arts by reading the disclosure herein.

In FIG. 8A, table 800 depicts sample metric data maintained in events DB 420. Columns 801 to 805 specify the details of the performance metric (including the application and component). It should be noted that the values in columns 801-805 together uniquely identifies each performance metric. Column 806 specifies the actual value of the performance metric captured at the nodes in the computing environment, while columns 807 and 808 specify the upper and lower thresholds for the performance metric. Each of rows 811-817 thus specifies the details of a corresponding event indicating the performance metric and corresponding actual value causing the issue/violation.

In FIG. 8B, data portion 820 is a portion of log data that specifies the details of an event. In particular, it may be observed that data portion 825 indicates that the violation is "Timed out waiting for lock". In addition, data portion 820 indicates the name of the application, component/service and sub-component/instance/process. The information in the log data may be captured as an event in table 800 as well and processed together with the metric data, as described herein.

FIG. 8C illustrates the manner in which details of the problems associated with events is maintained in one embodiment. Table 830 includes the same events of table 800 but with each event being associated with a corresponding problem as indicated by column 835. Thus, table 830 indicates that events/rows 811-817 are all associated with the same problem having the identifier "Alert12345". Similarly, other rows may specify the details of other events and associated problems (though only one problem is shown in table 830 for illustration).

FIG. 8D illustrates the manner in events received from performance management systems are processed in one embodiment. In particular, table 850 illustrates the manner in which events in rows 811-817 are processed by event evaluator 150. As noted above, it is assumed that events/rows 811-817 are received as part of event stream 410 for illustration. In alternative embodiments, different events specifying different performance metrics (columns 801-805) and corresponding values/thresholds (columns 806-808) may be received as part of event stream 410 and processed by event evaluator 150 as described below.

Column 861 indicates the anomaly scores calculated by preprocessor 510 for each event (811-817) received as part of event stream 410. Column 862 indicates the relevance scores generated by models 520 for the same set of events. Column 863 indicates the rankings generated by comparator 530 for the same set of events.

FIG. 8E depicts portions of configuration data in one embodiment. Data portion 870 indicates the number of priority slots to be reserved for each category. Line 871 is a comment and is ignored by orchestrator 470 (in particular, reservation logic 630). Line 872 indicates the category as being "Components", while lines 873 and 874 respectively indicate the number of slots (here, 2) to be reserved for each of "Frontend" and "Backend" components.

In view of the configuration data specified in data portion 870, orchestrator 470 first reserves the corresponding specified slots for each category and includes in the ranking list at least a first number of events (2) associated with "Frontend" (first category) having the highest ranking values and a second number of events (2) associated with "Backend" (second category) having the highest ranking values.

Assuming that only the top 5 ranks are to be provided to a user, only the events having the top 5 ranking values are selected from table 850. It may be readily observed that the top 5 ranking values includes 2 events associated with "Frontend" and 2 events associated with "Backend".

FIG. 8F illustrates the manner in which a ranking list (final result) is generated in one embodiment. Table 880 includes the events of table 800 but with each event being associated with a corresponding ranking value as indicated by column 884 and a final ranking as indicated by column 885. Only the top 5 ranking events are shown in table 880. The ranking values in columns 884 and 885 are the same in view of the top 5 events including 2 events associated with "Frontend" and 2 events associated with "Backend".

Figure 9A:
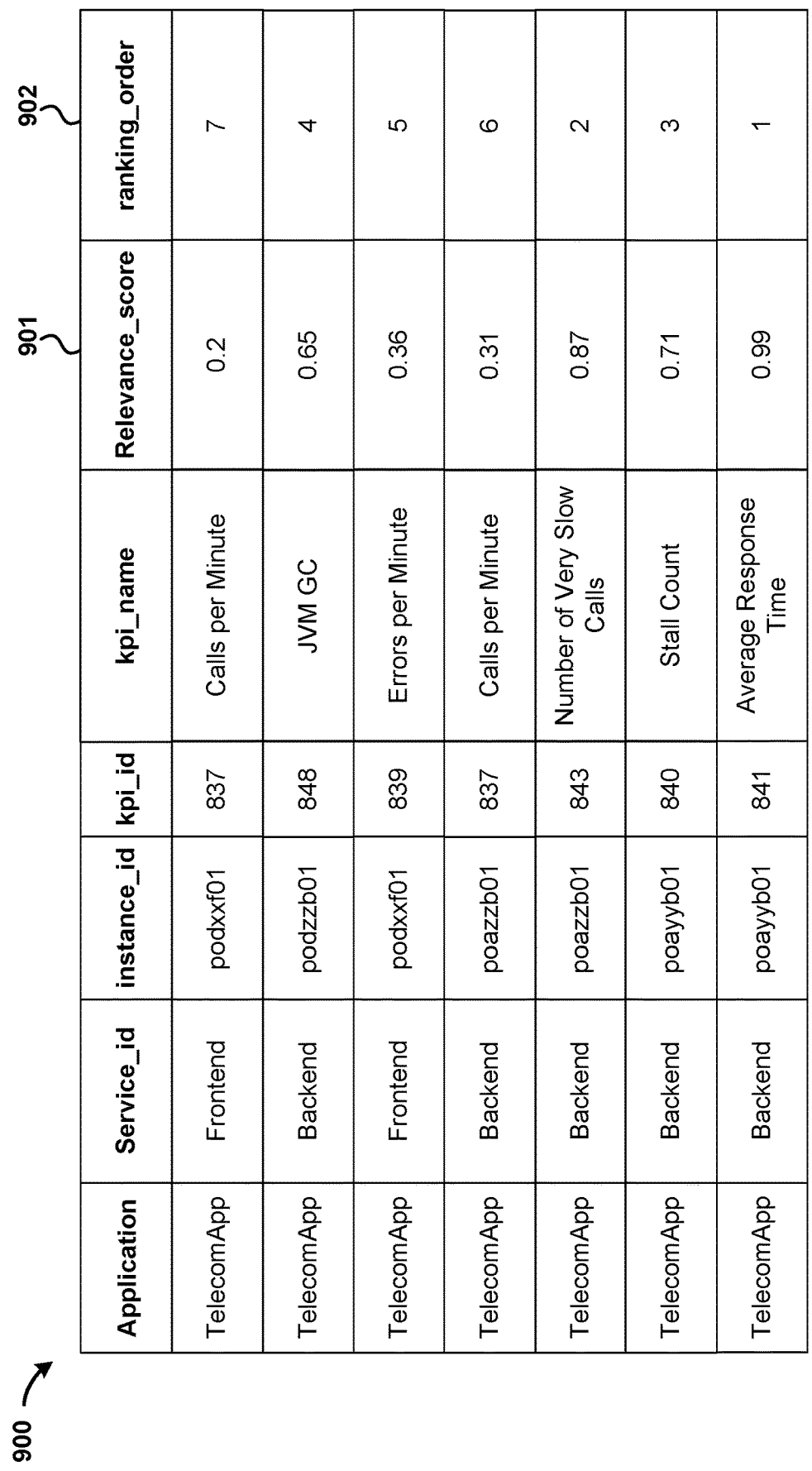
FIGS. 9A-9B together illustrate the manner in which another set of events received from performance management systems is processed in one embodiment.
Figure 9B:
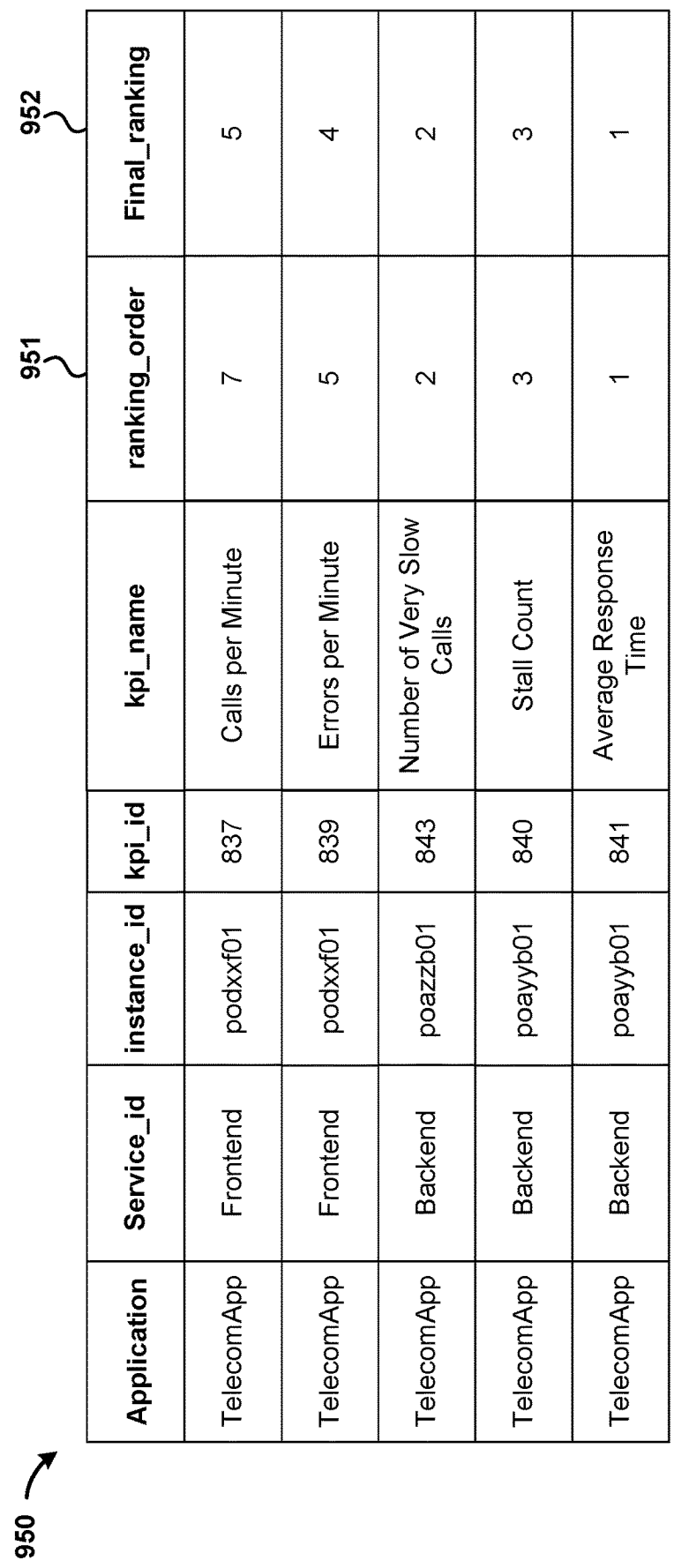

FIGS. 9A-9B together illustrate the manner in which another set of events received from performance management systems is processed in one embodiment. Table 900 of FIG. 9A indicates the relevance score (column 901) and ranking value (column 902) generated for the corresponding events shown in the rows. It may be readily observed that the top 5 ranking values includes only 1 event associated with "Frontend" and 4 events associated with "Backend". As such, two events associated with "Frontend" are included in the ranking list, prior to including the other events associated with "Backend".

Table 950 includes the top 5 ranking events from table 900 but based on the configuration data specified in data portion 870. It may be observed that the final ranking in column 952 is different from the ranking value in column 951. Also, the two events with the highest ranking values (5 and 7) have been included in the ranking list (as 4 and 5 respectively) in view of the configuration data specifying that the "Frontend" category has to have at least 2 events in the ranking list.

It should be further appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 10:
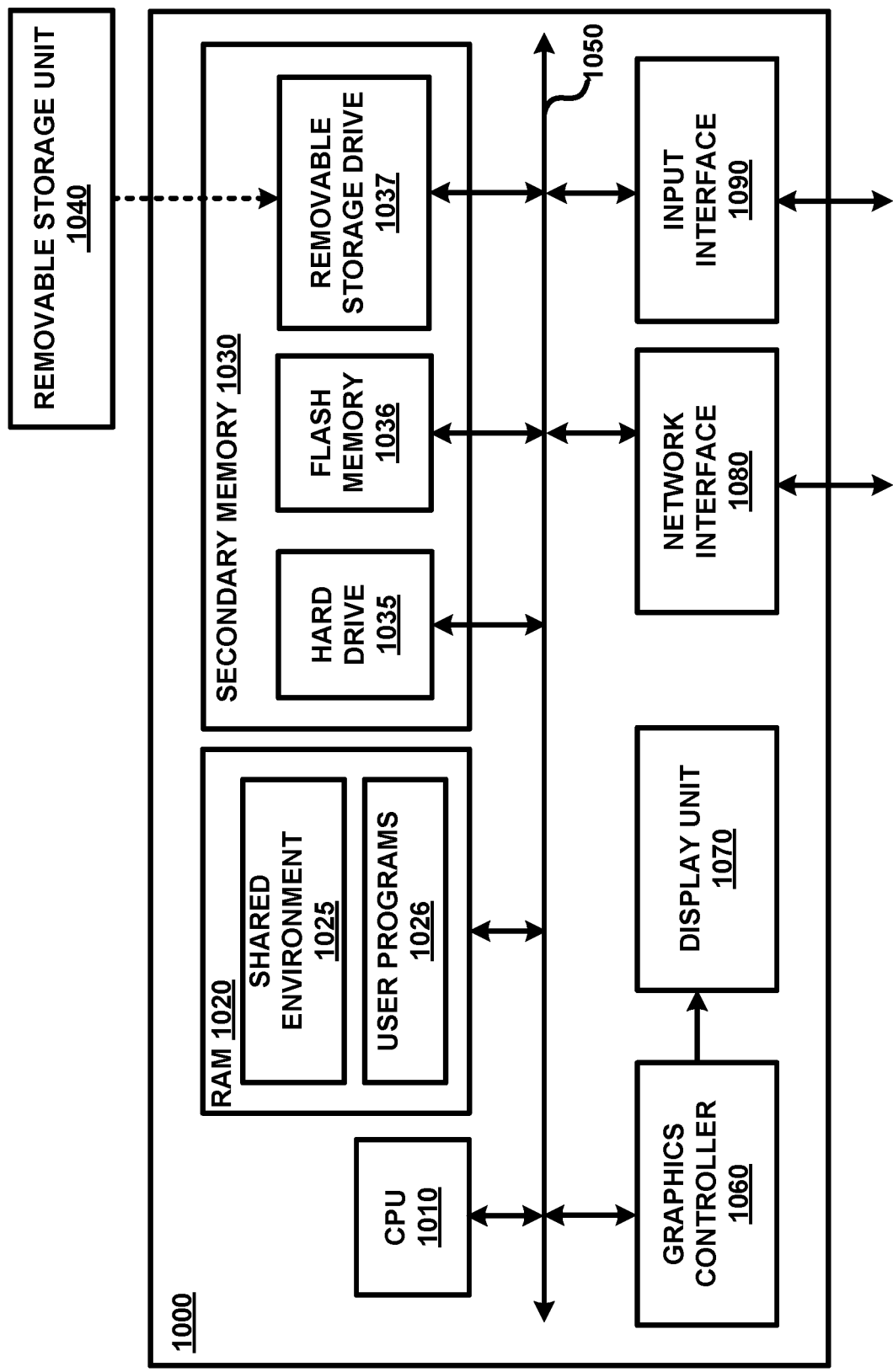
FIG. 10 is a block diagram illustrating the details of a digital processing system in which various aspects of the present disclosure are operative by execution of appropriate executable modules.

FIG. 10 is a block diagram illustrating the details of digital processing system (800) in which various aspects of the present disclosure are operative by execution of appropriate executable modules. Digital processing system 1000 may correspond to event evaluator 150 (or any system implementing event evaluator 150).

Digital processing system 1000 may contain one or more processors such as a central processing unit (CPU) 1010, random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present disclosure. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions constituting shared environment 1025 and/or other user programs 1026 (such as other applications, DBMS, etc.). In addition to shared environment 1025, RAM 1020 may contain other software programs such as device drivers, virtual machines, etc., which provide a (common) run time environment for execution of other/user programs.

Graphics controller 1060 generates display signals (e.g., in RGB format) to display unit 1070 based on data/instructions received from CPU 1010. Display unit 1070 contains a display screen to display the images defined by the display signals (e.g., portions of the user interface shown in FIG. 7). Input interface 1090 may correspond to a keyboard and a pointing device (e.g., touch-pad, mouse) and may be used to provide inputs (e.g., for the portions of the user interface shown in FIG. 7). Network interface 1080 provides connectivity to a network (e.g., using Internet Protocol), and may be used to communicate with other systems connected to the networks.

Secondary memory 1030 may contain hard drive 1035, flash memory 1036, and removable storage drive 1037. Secondary memory 1030 may store the data (e.g., data portions of FIGS. 8A-8F and 9A-9B) and software instructions (e.g., for implementing the steps of FIG. 2, for implementing the blocks of FIGS. 4, 5 and 6), which enable digital processing system 1000 to provide several features in accordance with the present disclosure. The code/instructions stored in secondary memory 1030 may either be copied to RAM 1020 prior to execution by CPU 1010 for higher execution speeds, or may be directly executed by CPU 1010.

Some or all of the data and instructions may be provided on removable storage unit 1040, and the data and instructions may be read and provided by removable storage drive 1037 to CPU 1010. Removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1040 or hard disk installed in hard drive 1035. These computer program products are means for providing software to digital processing system 1000. CPU 1010 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1030. Volatile media includes dynamic memory, such as RAM 1020. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1050. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions for providing a relevance ranking system for events identified by performance management systems, wherein execution of said one or more instructions by one or more processors contained in a digital processing system cause said digital processing system to perform the actions of:
   receiving, from one or more performance management systems, a plurality of events with each event being associated with a performance metric of a plurality of performance metrics;
   determining, based on said plurality of events, a corresponding relevance score for each of said plurality performance metrics;
   generating a ranking list of said plurality of events based on said corresponding relevance scores; and
   providing said ranking list of said plurality of events to a user,
   wherein said receiving, said determining, and said generating are performed for each time interval of a plurality of time intervals,
   wherein the relevance score for a specific performance metric in a specific time interval of said plurality of time intervals is determined based on:
   (A) an importance factor indicating the importance of said specific performance metric compared to other performance metrics in said specific time interval,
   (B) an impact factor indicating the likelihood that said specific performance metric will cause a problem, and
   (C) an interestingness factor characterizing the rarity of occurrence of said specific performance metric in said specific time interval.

2. The non-transitory machine-readable medium of claim 1, wherein said determining comprises one or more instructions for:
   generating a plurality of machine learning (ML) models corresponding to said plurality of performance metrics, each ML model correlating the combinations of importance score, impact score and interestingness factor with corresponding relevance scores for a respective performance metric; and
   predicting said corresponding relevance scores for said plurality of performance metrics in said specific time interval based on said plurality of ML models.

3. The non-transitory machine-readable medium of claim 1, further comprising one or more instructions for calculating for each event of said plurality of events, an anomaly score indicating a degree of anomaly of the associated performance metric, wherein said importance factor is computed as a sum of anomaly scores of a subset of events associated with said specific performance metric.

4. The non-transitory machine-readable medium of claim 1, wherein said impact factor is computed as a conditional probability of a problem occurring due to events associated with said specific performance metric.

5. The non-transitory machine-readable medium of claim 1, wherein said interestingness factor is computed as an IDF (Inverse Document Frequency) weight used in BoW (Bag-of-Words) model in natural language processing.

6. The non-transitory machine-readable medium of claim 1, further comprising one or more instructions for determining an abnormality score and a problem class for each time interval based on the relevancy scores of said plurality of performance metrics.

7. The non-transitory machine-readable medium of claim 6, wherein said determining said abnormality score comprises one or more instructions for:
   training a machine learning (ML) classifier based on relevance score vectors, each relevance score vector representing the relevance scores of said plurality of performance metrics in a corresponding time interval; and
   predicting said abnormality score for a specific time interval using said ML classifier.

8. The non-transitory machine-readable medium of claim 7, wherein said ML classifier groups the relevance score vectors into a plurality of clusters, each cluster of said plurality of clusters representing a corresponding problem class, wherein said determining said problem class comprises one or more instructions for:
   identifying that a specific relevance score vector for said specific time interval is similar to a first cluster of said plurality of clusters; and
   determining a first problem class represented by said first cluster as said problem class for said specific time interval.

9. The non-transitory machine-readable medium of claim 1, wherein each of said plurality of events is associated with a corresponding category, wherein said generating said ranking list of said plurality of events comprises one or more instructions for:
   assigning a ranking value to each event of said plurality of events based on the relevance score of the associated performance metric;
   inspecting a configuration data to determine that a first category and a second category are to respectively have a first number of events and a second number of events in said ranking list; and
   including in said ranking list, said first number of events associated with said first category having the highest ranking values and said second number of events associated with said second category having the highest ranking values,
   whereby said user is enabled to view the events related to both said first category and said second category together.

10. The non-transitory machine-readable medium of claim 9, wherein said first category and said second category relate to one of components of software applications, sub-components of the components of software applications, cloud infrastructures in which the software applications are deployed, and performance management systems deployed in the cloud infrastructures.

11. A computer implemented method for providing a relevance ranking system for events identified by performance management systems, said method comprising:

receiving, from one or more performance management systems, a plurality of events with each event being associated with a performance metric of a plurality of performance metrics;

determining, based on said plurality of events, a corresponding relevance score for each of said plurality performance metrics;

generating a ranking list of said plurality of events based on said corresponding relevance scores; and providing said ranking list of said plurality of events to a user, wherein said receiving, said determining, and said generating are performed for each time interval of a plurality of time intervals, wherein the relevance score for a specific performance metric in a specific time interval of said plurality of time intervals is determined based on:

(A) an importance factor indicating the importance of said specific performance metric compared to other performance metrics in said specific time interval, (B) an impact factor indicating the likelihood that said specific performance metric will cause a problem, and (C) an interestingness factor characterizing the rarity of occurrence of said specific performance metric in said specific time interval.

12. The method of claim 11, wherein said determining comprises:

generating a plurality of machine learning (ML) models corresponding to said plurality of performance metrics, each ML model correlating the combinations of importance score, impact score and interestingness factor with corresponding relevance scores for a respective performance metric; and predicting said corresponding relevance scores for said plurality of performance metrics in said specific time interval based on said plurality of ML models.

13. The method of claim 11, further comprising calculating for each event of said plurality of events, an anomaly score indicating a degree of anomaly of the associated performance metric, wherein said importance factor is computed as a sum of anomaly scores of a subset of events associated with said specific performance metric, wherein said impact factor is computed as a conditional probability of a problem occurring due to events associated with said specific performance metric, wherein said interestingness factor is computed as an IDF (Inverse Document Frequency) weight used in BoW (Bag-of-Words) model in natural language processing.

14. The method of claim 11, wherein each of said plurality of events is associated with a corresponding category, wherein said generating said ranking list of said plurality of events comprises one or more instructions for:

assigning a ranking value to each event of said plurality of events based on the relevance score of the associated performance metric;

inspecting a configuration data to determine that a first category and a second category are to respectively have a first number of events and a second number of events in said ranking list; and including in said ranking list, said first number of events associated with said first category having the highest ranking values and said second number of events associated with said second category having the highest ranking values, whereby said user is enabled to view the events related to both said first category and said second category together.

15. The method of claim 11, further comprising determining an abnormality score and a problem class for each time interval based on the relevancy scores of said plurality of performance metrics, wherein said determining said abnormality score comprises:

training a machine learning (ML) classifier based on relevance score vectors, each relevance score vector representing the relevance scores of said plurality of performance metrics in a corresponding time interval; and predicting said abnormality score for a specific time interval using said ML classifier.

16. The method of claim 15, wherein said ML classifier groups the relevance score vectors into a plurality of clusters, each cluster of said plurality of clusters representing a corresponding problem class, wherein said determining said problem class comprises:

identifying that a specific relevance score vector for said specific time interval is similar to a first cluster of said plurality of clusters; and determining a first problem class represented by said first cluster as said problem class for said specific time interval.

17. A digital processing system comprising:

a random access memory (RAM) to store instructions for providing a relevance ranking system for events identified by performance management systems; and one or more processors to retrieve and execute the instructions, wherein execution of the instructions causes the digital processing system to perform the actions of:

receiving, from one or more performance management systems, a plurality of events with each event being associated with a performance metric of a plurality of performance metrics;

determining, based on said plurality of events, a corresponding relevance score for each of said plurality performance metrics;

generating a ranking list of said plurality of events based on said corresponding relevance scores; and providing said ranking list of said plurality of events to a user, wherein said receiving, said determining, and said generating are performed for each time interval of a plurality of time intervals, wherein the relevance score for a specific performance metric in a specific time interval of said plurality of time intervals is determined based on:

(A) an importance factor indicating the importance of said specific performance metric compared to other performance metrics in said specific time interval, (B) an impact factor indicating the likelihood that said specific performance metric will cause a problem, and (C) an interestingness factor characterizing the rarity of occurrence of said specific performance metric in said specific time interval.

18. The digital processing system of claim 17, wherein for said determining, said digital processing system performs the actions of:

generating a plurality of machine learning (ML) models corresponding to said plurality of performance metrics, each ML model correlating the combinations of importance score, impact score and interestingness factor with corresponding relevance scores for a respective performance metric; and predicting said corresponding relevance scores for said plurality of performance metrics in said specific time interval based on said plurality of ML models.

19. The digital processing system of claim 17, said digital processing system further performing the actions of calculating for each event of said plurality of events, an anomaly score indicating a degree of anomaly of the associated performance metric, wherein said importance factor is computed as a sum of anomaly scores of a subset of events associated with said specific performance metric, wherein said impact factor is computed as a conditional probability of a problem occurring due to events associated with said specific performance metric, wherein said interestingness factor is computed as an IDF (Inverse Document Frequency) weight used in BoW (Bag-of-Words) model in natural language processing.

20. The digital processing system of claim 17, wherein each of said plurality of events is associated with a corresponding category, wherein for said generating said ranking list of said plurality of events, said digital processing system performs the actions of:

assigning a ranking value to each event of said plurality of events based on the relevance score of the associated performance metric;

inspecting a configuration data to determine that a first category and a second category are to respectively have a first number of events and a second number of events in said ranking list; and including in said ranking list, said first number of events associated with said first category having the highest ranking values and said second number of events associated with said second category having the highest ranking values, whereby said user is enabled to view the events related to both said first category and said second category together.

21. The digital processing system of claim 17, wherein said actions further comprise determining an abnormality score and a problem class for each time interval based on the relevancy scores of said plurality of performance metrics, wherein said determining said abnormality score comprises:

training a machine learning (ML) classifier based on relevance score vectors, each relevance score vector representing the relevance scores of said plurality of performance metrics in a corresponding time interval; and predicting said abnormality score for a specific time interval using said ML classifier.

22. The digital processing system of claim 21, wherein said ML classifier groups the relevance score vectors into a plurality of clusters, each cluster of said plurality of clusters representing a corresponding problem class, wherein said determining said problem class comprises:

identifying that a specific relevance score vector for said specific time interval is similar to a first cluster of said plurality of clusters; and determining a first problem class represented by said first cluster as said problem class for said specific time interval.

* * * * *